United States Patent
Ross

(10) Patent No.: US 11,566,653 B2
(45) Date of Patent: Jan. 31, 2023

(54) FOOTMAN LOOP CLIP

(71) Applicant: Networks Enterprises, Inc., New Hudson, MI (US)

(72) Inventor: Kenneth J. Ross, Wixom, MI (US)

(73) Assignee: Networks Enterprises, Inc., New Hudson, MI (US)

( * ) Notice: Subject to any disclaimer, the term of this patent is extended or adjusted under 35 U.S.C. 154(b) by 320 days.

(21) Appl. No.: 16/723,431

(22) Filed: Dec. 20, 2019

(65) Prior Publication Data

US 2020/0232496 A1 Jul. 23, 2020

Related U.S. Application Data

(60) Provisional application No. 62/793,425, filed on Jan. 17, 2019.

(51) Int. Cl.
| | | |
|---|---|---|
| *F16B 45/04* | (2006.01) | |
| *F16B 21/12* | (2006.01) | |
| *B60P 7/08* | (2006.01) | |
| *F16B 21/14* | (2006.01) | |

(52) U.S. Cl.
CPC .......... *F16B 21/125* (2013.01); *B60P 7/0807* (2013.01); *F16B 45/049* (2021.05); *F16B 21/14* (2021.08)

(58) Field of Classification Search
CPC ....... F16B 45/04; F16B 45/043; F16B 45/049
See application file for complete search history.

(56) References Cited

U.S. PATENT DOCUMENTS

| | | | | |
|---|---|---|---|---|
| 582,564 | A * | 5/1897 | Bolei ...................... | F16B 45/04 24/600.7 |
| 649,460 | A * | 5/1900 | Jordan .................... | F16B 45/04 294/82.23 |
| 730,075 | A * | 6/1903 | Allison ................... | F16B 45/04 24/600.7 |
| 1,475,046 | A * | 11/1923 | Bolei ...................... | F16B 45/04 294/82.23 |
| 1,598,684 | A * | 9/1926 | Jensen .................... | F16B 45/04 24/600.8 |
| 4,075,966 | A * | 2/1978 | Bates ...................... | B63H 9/08 294/82.35 |
| 5,040,934 | A | 8/1991 | Ross | |
| 5,636,889 | A * | 6/1997 | Bennett, Jr. ............... | B66C 1/36 294/82.23 |
| 6,017,174 | A | 1/2000 | Ross et al. | |
| 6,068,242 | A | 5/2000 | Kingery | |
| 6,092,791 | A | 7/2000 | Kingery | |
| 6,158,092 | A | 12/2000 | Huang | |
| 7,650,846 | B2 * | 1/2010 | McKim ................ | B63H 9/1042 114/107 |
| 9,254,779 | B2 | 2/2016 | Kingery | |
| 9,254,989 | B2 | 2/2016 | Kingery | |
| 9,272,886 | B2 | 3/2016 | Kingery | |

(Continued)

*Primary Examiner* — Flemming Saether
(74) *Attorney, Agent, or Firm* — Fishman Stewart PLLC

(57) ABSTRACT

A footman loop clip includes a body and a bend formed in the body such that an end of the body is inboard of the bend, the body having an aperture. A pin passes through the aperture and has a pin head on one end, and a pull feature on the other end. A spring biases the pull feature toward the body. The pull feature is biased toward the body and when the pull feature is pulled a gap is formed and increased between the pin head and the end of the body.

21 Claims, 7 Drawing Sheets

(56) References Cited

U.S. PATENT DOCUMENTS

| 10,035,452 B2 * | 7/2018 | Hill ........................ B60P 3/079 |
| 2016/0025623 A1 | 1/2016 | Andersson |
| 2018/0215321 A1 * | 8/2018 | Allen ........................ B60R 9/00 |

* cited by examiner

FIG. 10
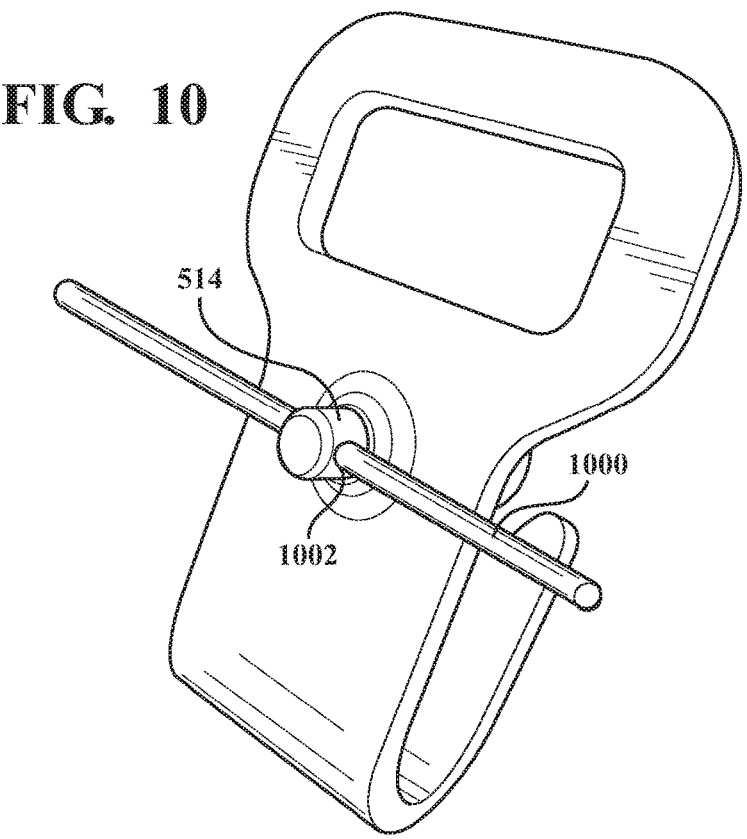
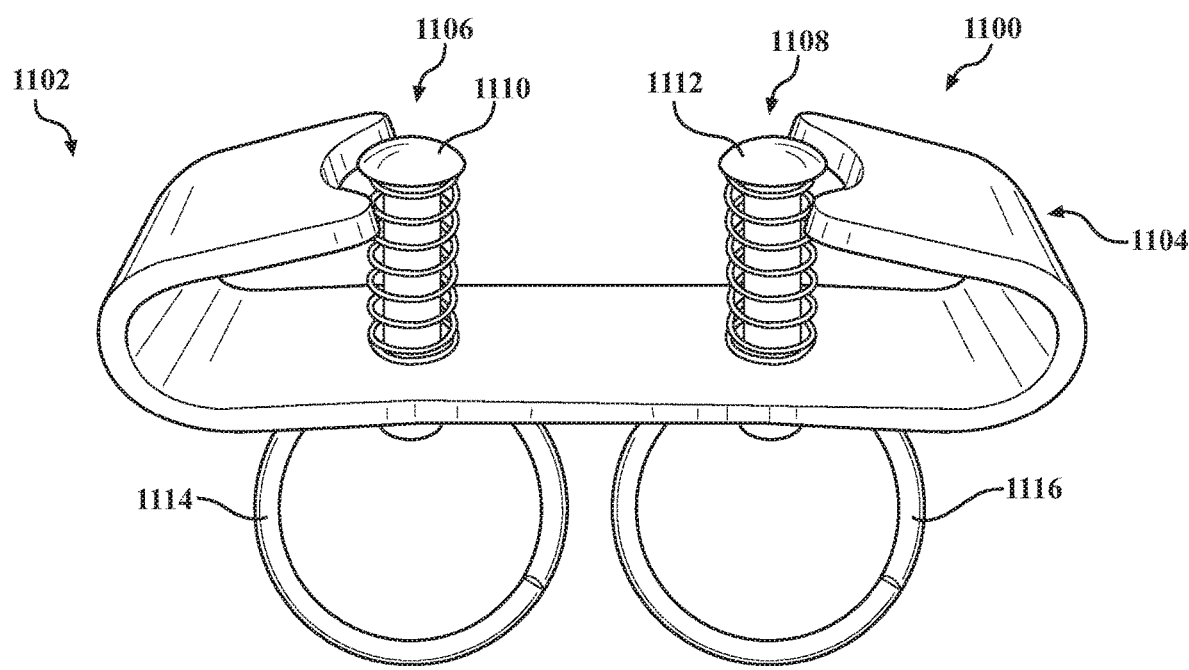
FIG. 11

FOOTMAN LOOP CLIP

CROSS-REFERENCE TO RELATED APPLICATIONS

This application claims priority to U.S. Provisional Patent Application No. 62/793,425, filed on Jan. 17, 2019, the contents of which are incorporated herein by reference in their entirety.

FIELD OF TECHNOLOGY

The present disclosure relates to exterior and interior attachment features for military and other outdoor rugged terrain vehicles. More specifically, the present disclosure relates to a clip for use on a footman loop.

BACKGROUND

Military and other outdoor rugged (non-military) terrain vehicles often include attachment features on the exterior and interior surface for carting equipment safely and intact. Vehicles may include but are not limited to military vehicles (tanks, Humvees, and Bradley Fighting Vehicles, as examples) and recreational vehicles. Other types of vehicles that may use attachment features may include firetrucks, emergency response vehicles, and boats, as further examples. These attachment features (better known as tie-down points on most vehicles) enable a user to readily and quickly attach equipment to the exterior or interior of the vehicle, such as when soldiers are moving out or deploying, and need a device to hold their equipment to the vehicle. The equipment may itself be attached directly to the attachment feature, or the equipment may be contained within cargo netting, which is attached to the vehicle via the attachment features.

Equipment may be contained on an outside of a vehicle by a rope attached to a simple hook, with the hook captured against the footman loop. Other attachment devices and methods may include straps that attach to the attachment features, which may then be tightened by pulling the strap taught using a tensioning device, for example. On the ends of the straps may be attachment devices such as clips or hooks. One such device is the Kinedyne® clip that is permanently sewn into the straps at each end. This method with the Kinedyne clip can only be used if the tie-down point is small enough to allow the clip to go around.

This known device, commonly referred to as a Kinedyne cargo strap, includes a strap that extends between metal hook components, such as a Kinedyne clip, and is used to attach equipment to a vehicle. The metal hook components of the Kinedyne clip include a metal loop shaped as a "J" that can pass over an attachment feature on a vehicle, and a spring-loaded pin mechanism captures the metal hook. The metal hook components also include an opening surrounded by metal, to which straps attach. The straps extend between metal hook components on each end, and the straps are coupled together via a tensioner device (such as a ratchet) that operates to tighten the straps by shortening the distance between the metal hook components. Thus, in use, the Kinedyne cargo strap is attached at each end to a respective attachment feature, and the strap is placed over equipment (such as a ruck sack or other gear) that is desired to be held fast to a vehicle. The tensioning device is operated to hold the equipment to the vehicle, and includes a release feature that can subsequently be activated that releases tension in the strap so that the equipment can be quickly grabbed from the vehicle.

During use, however, the Kinedyne clip may be difficult to remove from its attachment feature. The spring-loaded mechanism that constrains the hook from falling loose includes a spring-loaded extension that is pressed from one end, which then frees up the hook so that is may pass over the attachment feature. However, the spring-loaded extension often will fall or be pressed against the vehicle, and when the cargo strap is tightened, it may be inaccessible and therefore difficult to remove. In addition and even if the spring-loaded extension is facing away from the vehicle, its operation also is difficult nevertheless. Typically a person will use their thumb to press the spring-loaded extension. In doing so, when the spring-loaded extension is depressed, the thumb thereby is positioned blocking the hook, which interferes with the ability to pass the hook over the attachment feature. That is, when the spring-loaded extension is depressed, the thumb doing the depressing falls squarely in the region of the hook that is passed over the attachment mechanism. Also, if a Kinedyne clip is used on an armored military vehicle, the open "J" shape will face the vehicle and render the release pin useless, making the task of removal more difficult. Generally, however, the Kinedyne clip is too small of a clip in every aspect and therefore is not used on footman style vehicles in the military.

In addition, the Kinedyne clip is typically fabricated having its pin elastically deformed so as to cause interference with its body. During fabrication of the Kinedyne clip, such deformation makes it impractical to repair damaged product, such as a faulty spring or a faulty pin, and the pin needs to be cut from the body for repair.

When soldiers are moving out and need a device to hold their equipment to their armored vehicle these tie-down points become footman loops that allow a strap with one end bare and the other with an alligator style tensioning clip. The straps are fed through slots in a metal bracket attached to the armor (footman loop bracket). Another style includes a strap that is fed through openings under welded rods shaped like half a rectangle protruding off the vehicle surface about a quarter of an inch and repeats every couple of inches down the side off the vehicle (footman loop). These known devices include several disadvantages in use. They can be cumbersome, difficult to tighten (such as using an "alligator" tensioning clip), and are prone to be jarred loose during use—to name just a few. Also, the Kinedyne clip is prone to snag with equipment because the pin head is exposed and can catch on straps, equipment, clothing, and the like during use.

There therefore remains a need for improving how to attach equipment to an attachment feature of a vehicle.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 10 is a top perspective view of the disclosed footman loop clip with a pull bar; and FIG. 11 is a two-ended footman loop clip according to an alternative disclosed arrangement.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

The present disclosure provides generally for an improved clip for attaching equipment to a vehicle, such as a footman loop.

Figure 1:
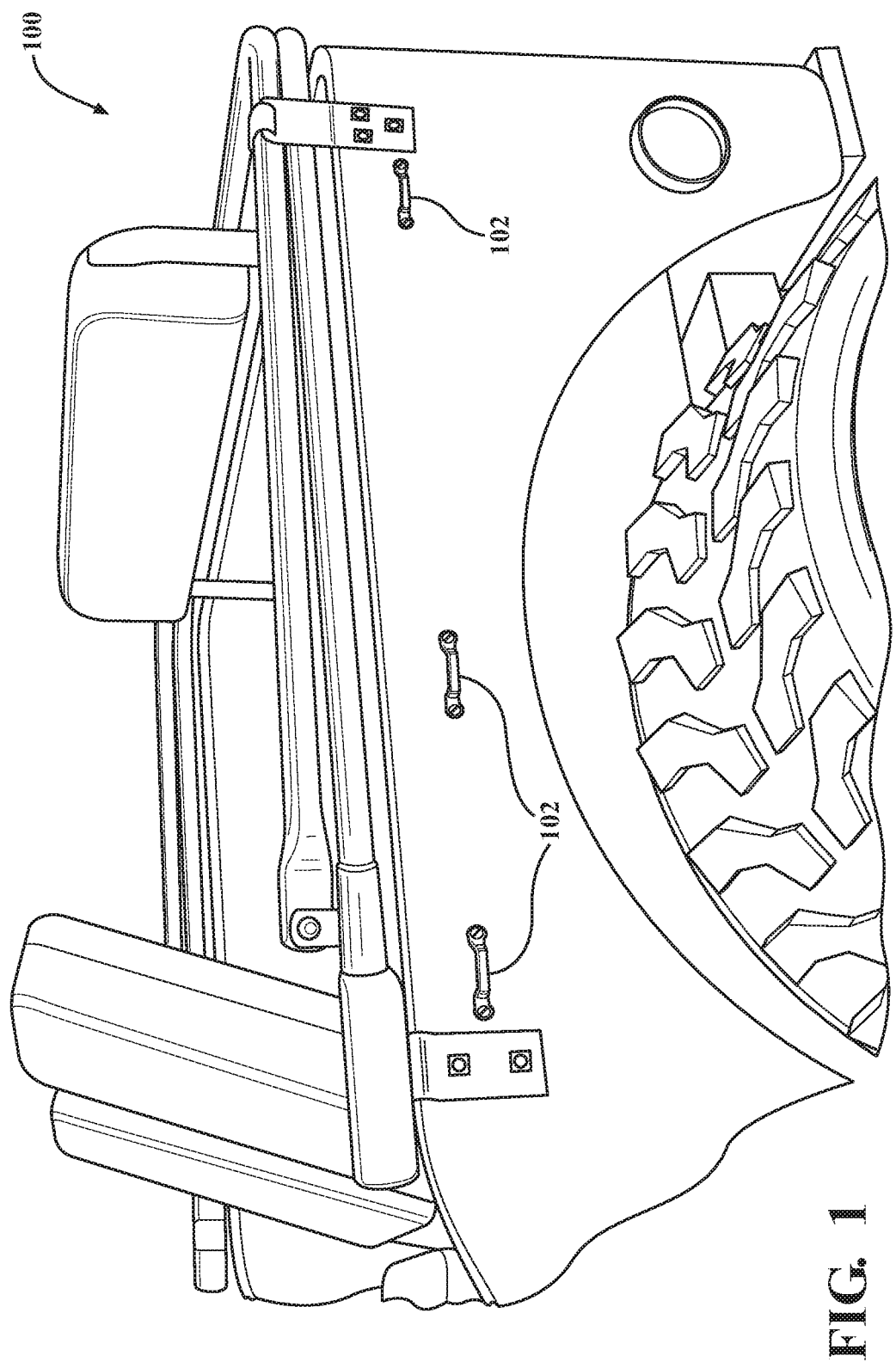
FIG. 1 is an exemplary view of a side of a military vehicle with footman loops.
Figure 2:
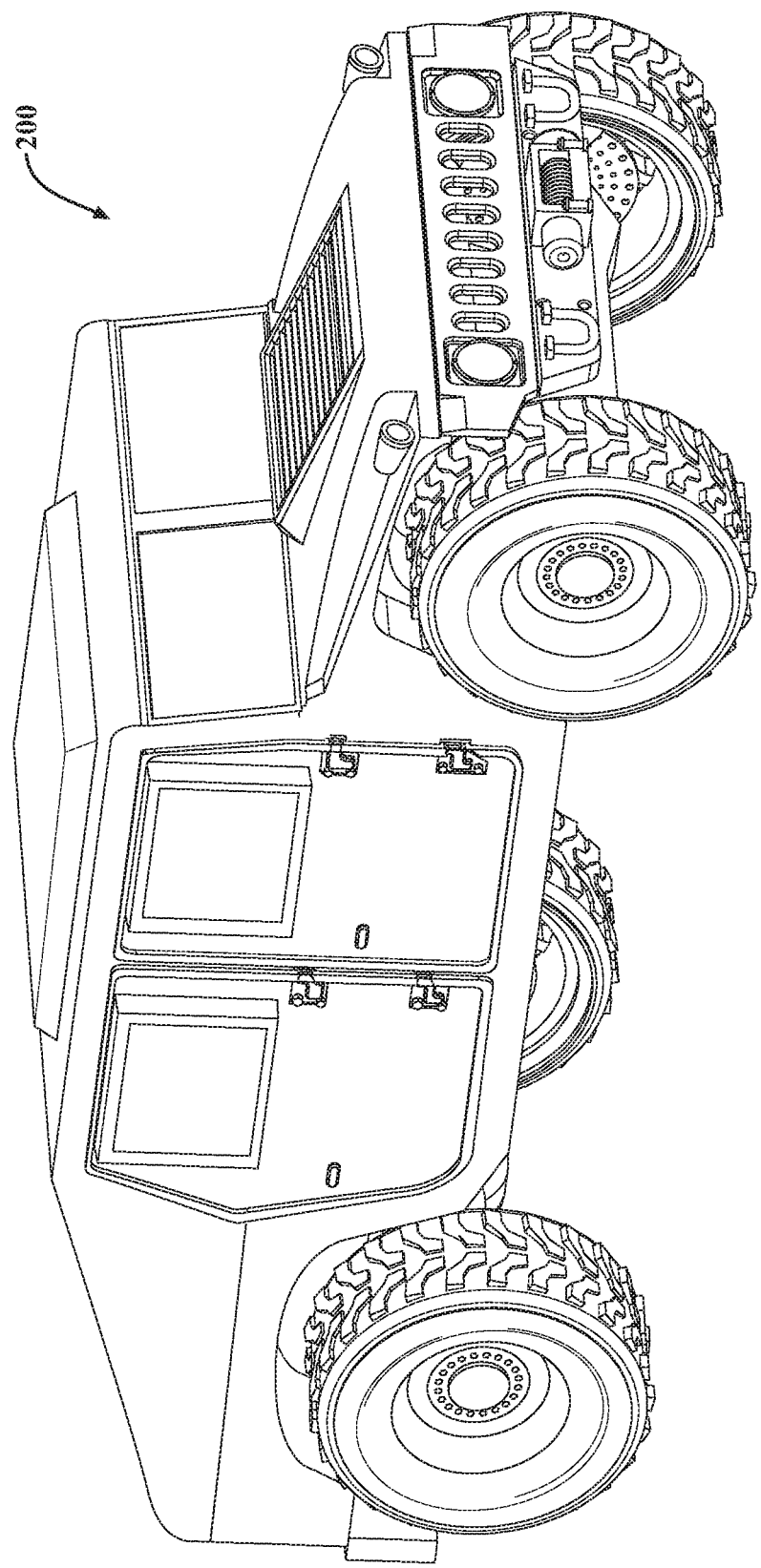
FIG. 2 is an exemplary military vehicle that may include footman loops for use of the disclosed footman loop clip.

Referring to FIG. 1, an exemplary view of a side of a military vehicle 100, such as a traditional jeep, with footman loops 102 is shown, and to which the disclosed subject matter is applicable. FIG. 2 illustrates another military vehicle 200, such as a Humvee, and is also exemplary of the type of vehicle to which the disclosed subject matter is applicable.

Figure 3:
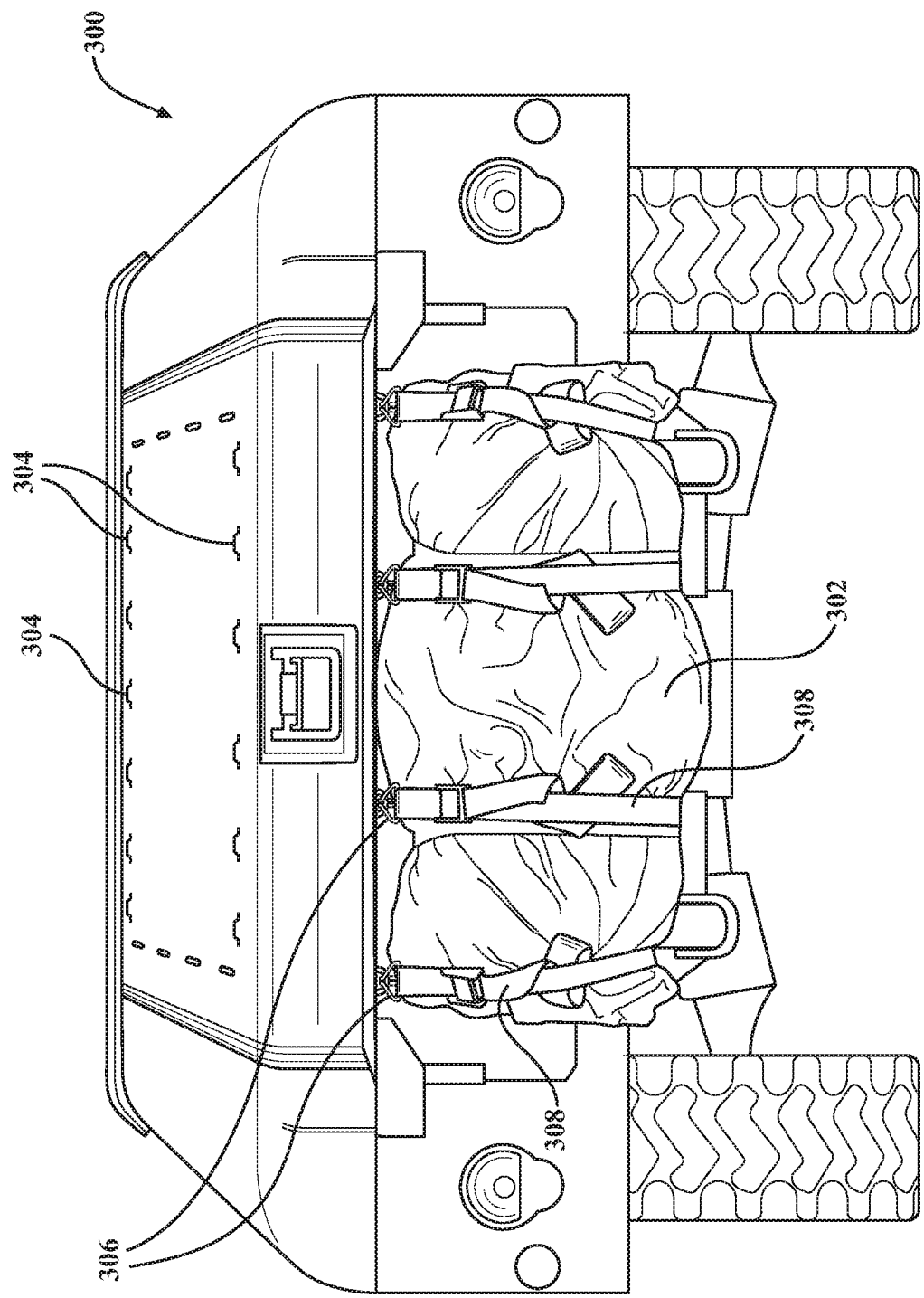
FIG. 3 is a back view of a vehicle similar to that of FIG. 2 and having material attached thereto in a conventional fashion.
Figure 4:
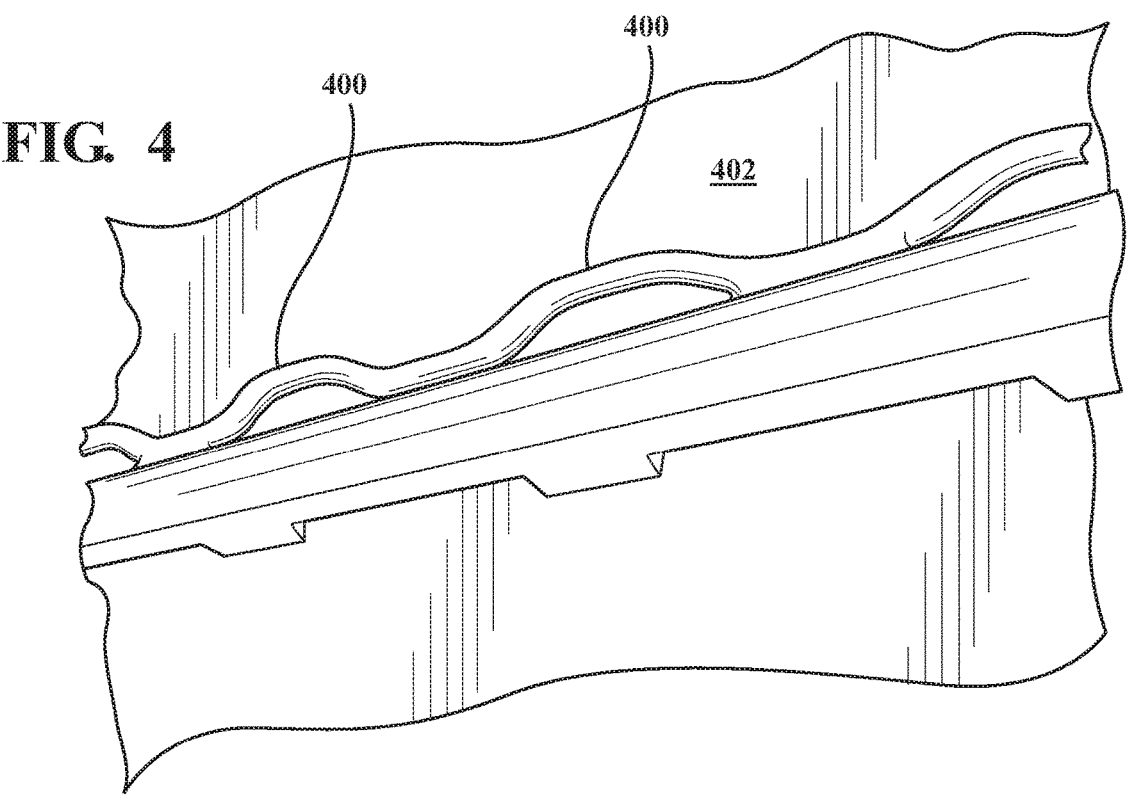
FIG. 4 is an example of a type of footman loop.

FIG. 3 is a back view of a vehicle 300 similar to that of FIG. 2 and having material 302 attached thereto in a conventional fashion. Vehicle 300 includes footman loops 304 and also includes clasps or attachments 306, to which equipment is attached via straps 308. FIG. 4 is an example of a type of footman loops 400 on a side 402 of a vehicle.

According to the disclosure, attachments to the vehicles can take many forms, including footman loops 102 in FIG. 1, footman loops 304 in FIG. 3, attachments 306 in FIG. 3, and footman loop 400 of FIG. 4. Thus, it is contemplated that the term "footman loop" as disclosed herein is applicable to any attachment on the side of a vehicle, to which the disclosed "footman loop clip" may be attached. In addition, vehicles 100 and 300 shown herein are but exemplary vehicles, and it is contemplated that vehicles as disclosed herein may be not only a jeep or Humvee, but any sort of vehicle to include but not be limited to a Bradley fighting vehicle, a Mine Resistant Ambush Protected (MRAP) vehicle, an Assault Breacher Vehicle (ABR), a Pandur vehicle, a C2V command and control vehicle, a Hercules M88 recovery vehicle, a Wolverine M104 vehicle, an RG-31 multi-purpose mine resistant vehicle, an RG-33 multi-purpose vehicle, a Caiman vehicle, an Oshkosh M-ATV, a Buffalo vehicle, a Nuclear Biological Chemical (NBC) vehicle, an M1 Abrams tank, a Light Armored Vehicle (LAV), a Joint Light Tactical Vehicle (JLTV), and M109 Paladin, and an IAV Stryker vehicle, as examples.

Figure 5A:
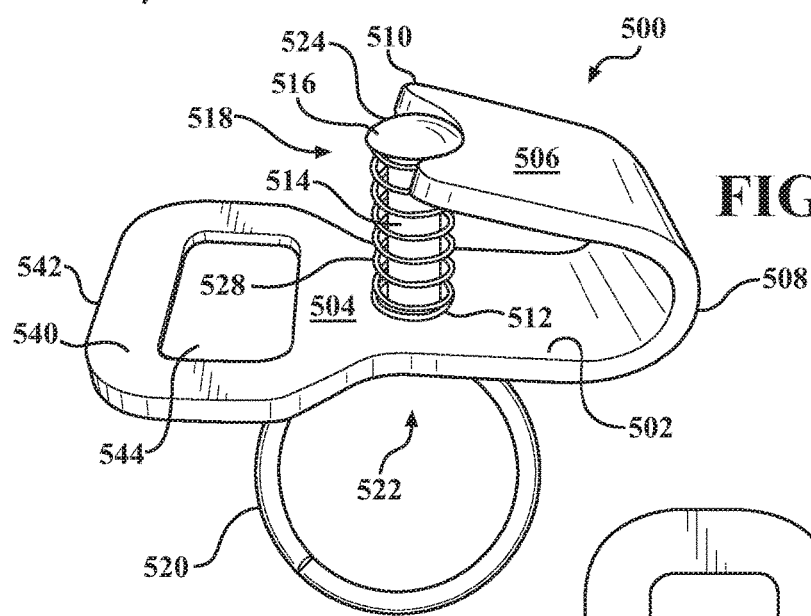
FIG. 5A is a top perspective view of a footman loop clip according to the disclosure.
Figure 6:
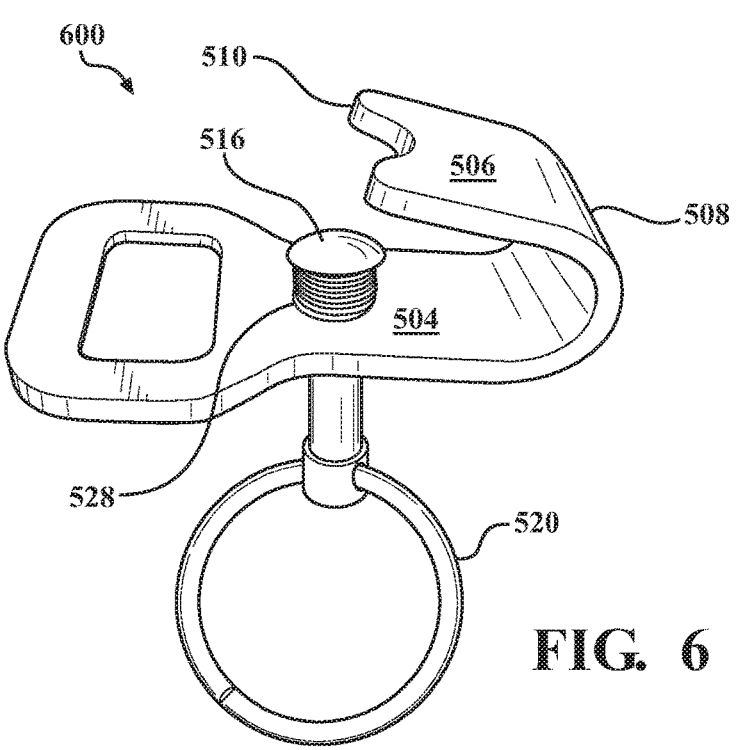
FIG. 6 is an illustration of the footman loop of FIG. 5A at a second position.

FIG. 5A is a top perspective view of a footman loop clip 500 according to the disclosure. Footman loop clip 500 includes a body 502 having a first portion 504 and a second portion 506, and a bend 508 formed between first portion 504 and second portion 506 such that an end 510 of second portion 506 is inboard of bend 508, first portion 504 having an aperture or hole 512 passing therethrough. A pin 514 passes through hole or aperture 512 and includes pin head 516 on one end 518 and on one side of first portion 504, and having a pull feature 520 on the other end 522 and on the other side of first portion 504, pin head 516 having an outer diameter 524 that is larger than a diameter 526 of aperture 512. A spring 528 surrounds pin 514 that biases pull feature 520 toward second portion 506, spring 528 positioned between pin head 516 and first portion 504 such that when pin 514 is at a first position (FIG. 5A), pull feature 520 is biased at a first bias force toward first portion 504. When pull feature 520 is pulled away from first portion 504 such that pin 514 is at a second position (FIG. 6), pull feature 520 is biased at a second bias force that is greater than the first bias force, and a gap 600 formed between pin head 516 and end 510 of second portion 506 is increased.

Figure 5B:
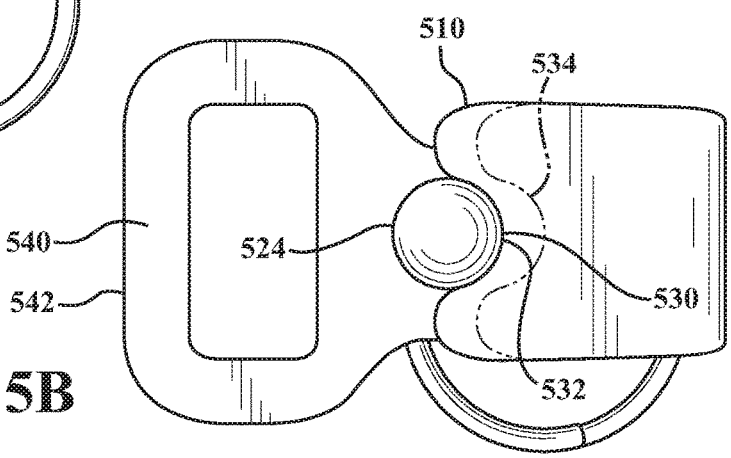
FIG. 5B is a top planar view of the disclosed footman loop clip.

FIG. 5B is a top planar view of footman loop clip 500 showing body 502, and end 510 having a cutout profile 530 that, in the illustrated example, has a curvature that generally follows a profile of pin head 516. In one example cutout profile 530 is set back or away from wherein shown for element 530, as illustrated in optional location 534. Cutout profile thereby provides, in one example (such as when cutout profile 530 corresponds with location 534), a clearance for a finger or thumb to be used to depress pin head 516, and also provides clearance for pin 516 to pass through body 502 during assembly of footman loop clip 500. In another example and corresponding with cutout profile 530, end 510 of second portion 506 includes a diameter 532 that is approximately the same as outer diameter 524 of pin head 516. In one example, when pin 514 is at the first position (FIG. 5A) cutaway of the second portion is in contact with the outer diameter of the pin head over at least 60 degrees about the circumference of the pin head. As such, having outer diameter 524 of pin head 516 at approximately the same diameter as diameter 532 of end 510, a propensity to catch or snag pin head 516 during use is reduced. In such an example, pin head 516 is positioned against end 510 and is embedded against cutout profile 530, reducing the likelihood of inadvertently or accidentally depressing pin head 516 when footman loop clip is installed on a vehicle or about a footman loop.

According to the disclosure, in one example diameter 532 "hugs" a portion of the diameter of the pin head at element 530. That is, in this example both have the same nominal diameter and are toleranced so that the two are in contact with one another when pin head 516 is positioned at its extended location as shown in FIG. 5A. In addition, typically there may be a nominal amount of "play" in pin 514 when in hole 512 that allows pin 514 to rock or move at small angles with respect to first portion 504. This small amount of play allows for pin 514 and second portion 506 to have a nominal amount of actual interference between pin head 516 and diameter 532, which can cause a force to be imparted between the two when pin head 516 is positioned at its extended position within the rounded depression of second portion 506. In such fashion, the propensity for equipment, clothing and other materials to "snag" by being captured between pin head 516 and diameter 532 of second portion 506 is reduced, as very little or no gap is present. Thus, although a thumb or finger may be used to depress pin head 516 instead of pulling from the other side via pull feature 520 (such as in an instance when footman loop clip is installed having pull feature 520 facing toward a vehicle), it may not be necessary if installed having pull feature 520 facing away from the vehicle. In addition, and according to the disclosure, pin head 516 includes a curved upper surface that generally prevents pin head 516 from getting "hung up" on the second portion 506 after pin 514 moves back to its fully biased position.

Figure 5C:
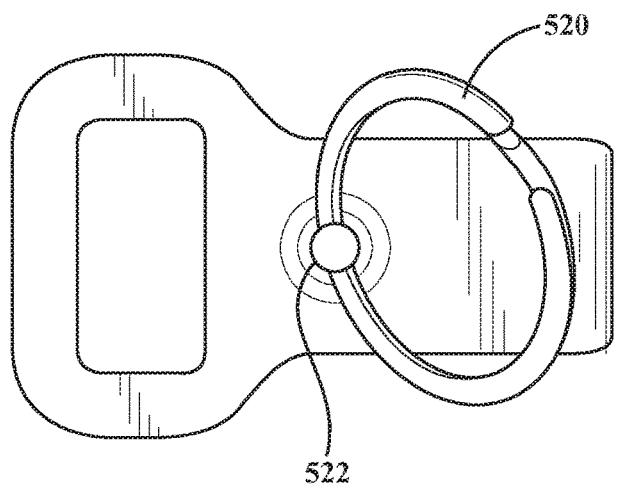
FIG. 5C is a bottom planar view of the disclosed footman loop clip.
Figure 5D:
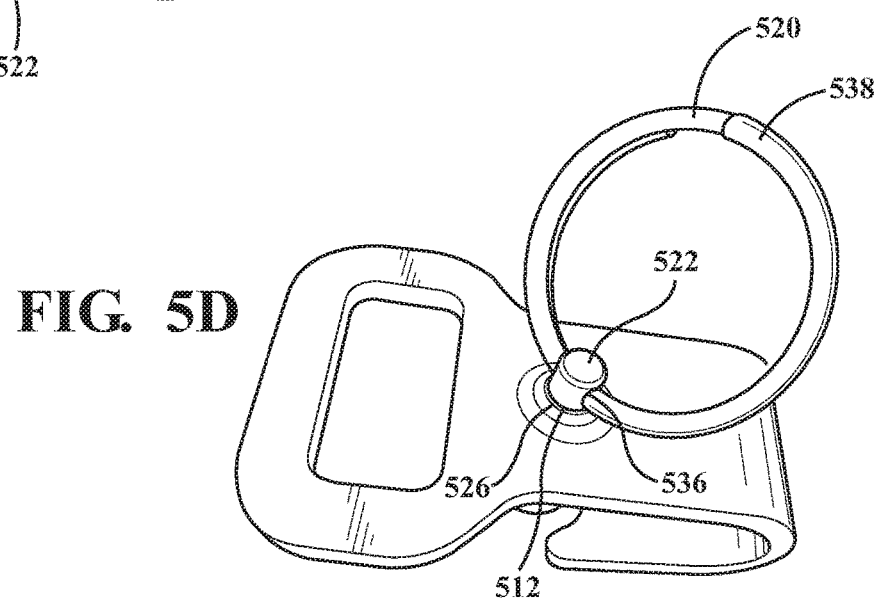
FIG. 5D is a bottom perspective view of the disclosed footman loop clip.

FIG. 5C is a bottom planar view of footman loop clip 500, and FIG. 5D is a bottom perspective view of footman loop clip 500. Pull feature 520, as shown in the example of FIGS. 5A-5D, is a ring made of an interleaved metal, commonly used for key rings and the like, which can be fed through a hole or aperture 536, at a second or other end 522 of pin 514 during assembly. That is, the ring includes an end 538 that can be pulled away from the ring and then fed into hole or aperture 536 that is in end 522 of pin 514. The ring is rotated until the entire body of the ring is positioned within hole 536, as commonly done with key rings and the like. In this fashion, a diameter of pin 514 at end 522 is smaller than diameter 526 of aperture 512, which simplifies assembly of footman loop clip 500 because no further steps are necessary to prevent pin 514 from passing through aperture 512 (such as plastically deforming pin 514 ate end 522).

According to the disclosure, a lip 540 is formed on an end 542 of first portion 504 and includes an opening 544 through which straps, carabiners, and the like, may pass. As such, when pull feature 520 is pulled, pull feature 520 passes through hole 512, and spring 528 causes pin head 516 and ultimately spring 528 to press against body 502.

Figure 7:
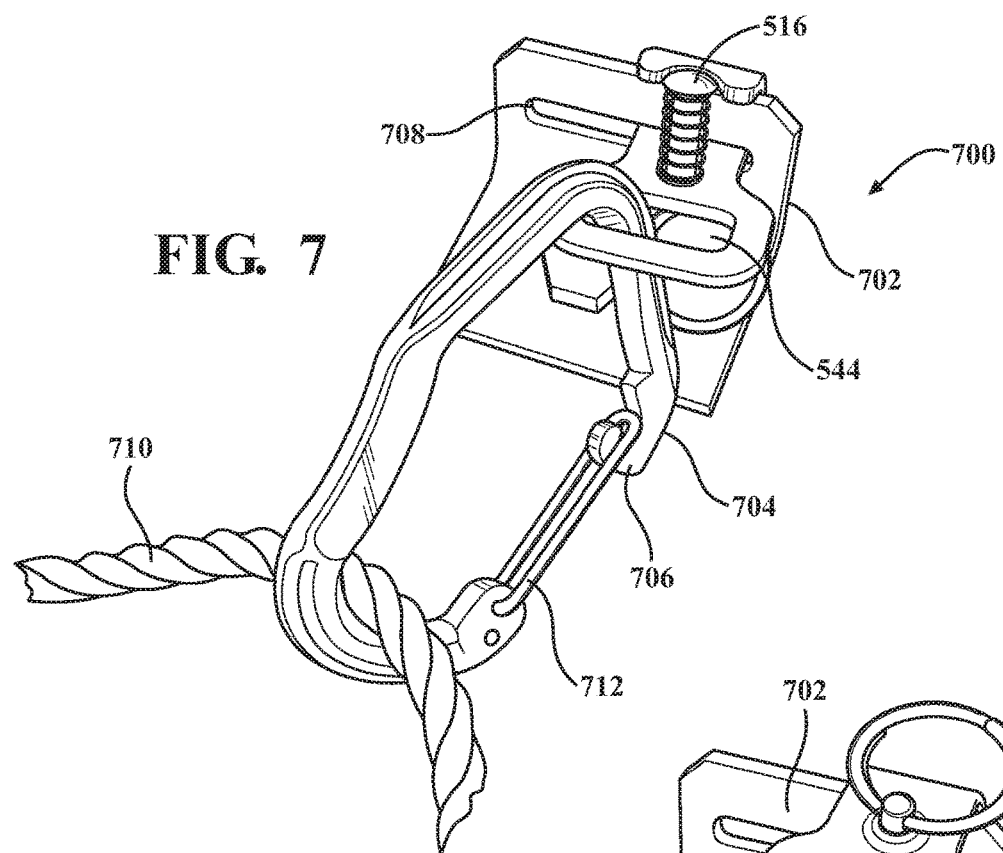
FIG. 7 is a view of the disclosed footman loop according to one exemplary arrangement.

FIG. 7 is a view of an assembly 700 showing the disclosed footman loop clip 500 according to one exemplary arrangement. Assembly 700 includes footman loop clip 500 positioned within a bracket 702, and having a carabiner 704 attached thereto. Bracket 702, according to the disclosure, can include any attachment feature that may be used to attach gear to a vehicle, such as (but not limited to) footman loops 102 or footman loops 302, as discussed. Carabiner 704 includes an end 706 having been passed through opening 544. Second portion 506 and bend 508 of footman loop clip 500 is passed through an aperture 708 of bracket 702. In the illustrated example, a rope 710 is passed through carabiner 704 and is positioned to hold material, such as material 302 as illustrated in FIG. 3. According to the disclosure, any type of attachment mechanism may pass through opening 544, and it need not be carabiner 704 as shown. Other examples include but are not limited to ropes passing directly through opening 544, straps, netting, or any flexible or bendable material that may be used to attach material to a vehicle. In operation, rope 710 may be detached by either removing carabiner 704 via its spring-loaded clip 712, or more conveniently when a strap or roped are used in lieu of carabiner 704 by depressing pin 514 using pin head 516, pressed against spring 528.

Figure 8:
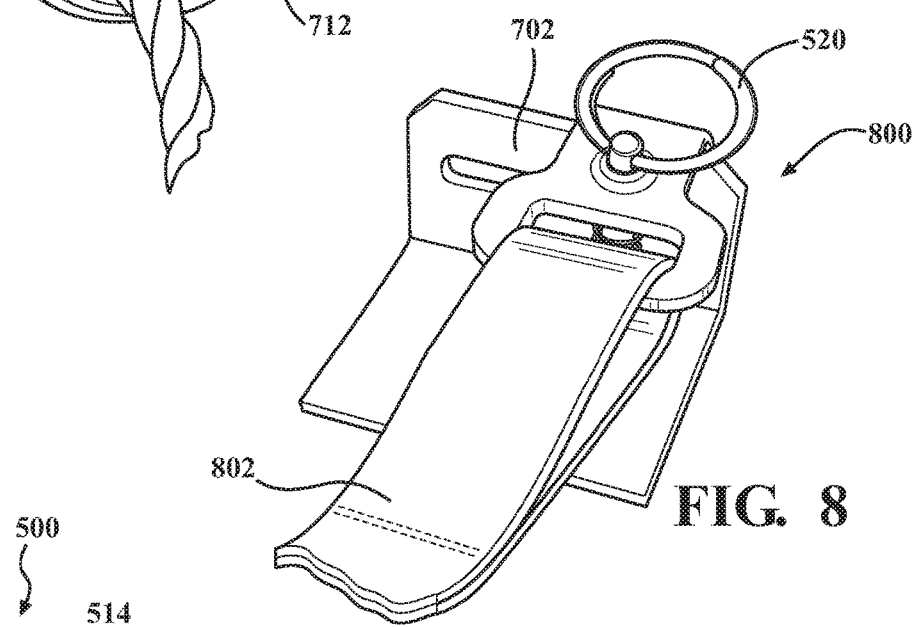
FIG. 8 is a view of the disclosed footman loop according to the exemplary arrangement but in a reversed orientation.

FIG. 8 is a view of the disclosed footman loop according to the exemplary arrangement but in a reversed orientation. In this example, an assembly 800 includes the disclosed footman loop clip 500 according to one exemplary arrangement. Bracket 702, according to the disclosure, can include any attachment feature that may be used to attach gear to a vehicle, such as (but not limited to) footman loops 102 or footman loops 302, as discussed. In this arrangement, however, a strap 802 is used to hold material. Strap, however, may be difficult to detach rapidly and so it may be desirably to detach footman loop clip 500 from the vehicle in a quick fashion. As such, footman loop clip is oriented opposite that of FIG. 7, which provides direct access to pull feature 520, shown again as a ring. Thus, to remove footman loop clip 500 from bracket 702, a user (such as military personnel) simply and conveniently pulls on pull feature 520, causing pin head 516 to pull against spring 528, forming an opening or clearance 600 (FIG. 6) to be formed between end 510 and body 502. This arrangement is in contrast to that shown in FIG. 7, where depression of pin head 516 using a finger or thumb will thereby cause difficulty to remove footman loop clip 500 from bracket 702. In other words, to maintain compression against pin head 516, in the arrangement shown in FIG. 7, a finger or thump is pressed which thereby then interferes with the desired movement of slipping second portion 506 and bend 508 through aperture 708. That is, although possible to do, such interference can cause for cumbersome movements, which makes it difficult to quickly and effectively remove footman loop clip 500 from bracket 702. The disclosed apparatus therefore alleviates such cumbersome activity by providing a quick and accessible pull feature, shown as a ring in the example, which can be simply pulled away from the vehicle in order to free up footman loop clip 500 for removal from the vehicle. And, according to the disclosure, any type of attachment mechanism may pass through opening 544, and it need not be a strap as shown.

The disclosed footman loop clip thereby provides quick and efficient removal of material from attachment to a vehicle, by providing simple and quick access to the pin that is compressed by a spring, as discussed. However, although a ring is illustrated and discussed above as pull feature 520, it is contemplated that other devices may be used as well.

Figure 9:
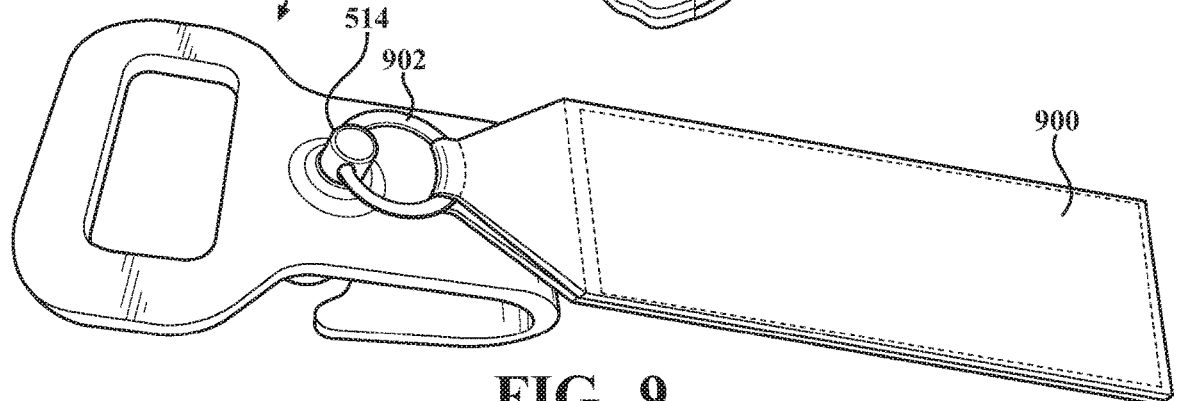
FIG. 9 is a top perspective view of the disclosed footman loop clip with a pull strap.

For instance, FIG. 9 is a top perspective view of the disclosed footman loop clip with a pull strap, and FIG. 10 is a top perspective view of the disclosed footman loop clip with a pull bar. In both examples, rather than pulling on a ring as discussed, a pull strap 900 or a pull bar 1000 may be used. Referring to FIG. 9, pull strap 900 is attached to hole or aperture 536 via a ring 902, and may be a woven strap or a key FOB. In another example, referring to FIG. 10, pull bar 1000 (made of metal or other hard material, as example) is provided and may be a straight roll style pin that is press-fit into its hole 1002 in pin 514, forming a T-handle to pull pin 514 for removal of the footman loop clip. In one example the T-pull is wider than the body of the Footman Loop Clip. Thus, in both examples, pull strap 900 or pull bar 1000 may be used as pull feature 520 for causing simple and efficient removal of footman loop clip 500, when deployed and holding equipment or material to a vehicle.

Further, and according to the disclosure, it is contemplated that pin 514 includes a diameter that is smaller than hole 512, through which pin 514 passes. This can be advantageous for efficiency of assembly of footman loop clip 500, enabling pin 514 to be inserted into hole 512, with spring 528 positioned thereon, and inserting the ring, strap, or pull bar thereto. This can be in contrast to plastically deforming the pin in place, which can make repair of a faulty or damaged footman loop clip difficult. That is, although it is contemplated that pin 514 may be plastically deformed so that it cannot pass through hole 512, it is favorable to include, instead, a pull device that can pass through a hole, such as hole or aperture 512, so that pin 514 can be readily removed from body 502 and replaced in the field, if necessary. In addition, and according to the disclosure, it is contemplated that pin 514 is a solid or machined pin, and not hollow, which provides not only additional robustness to the overall clip, but provides a solid material for a hole to pass through for attaching a pull device.

FIG. 11 is a two-ended footman loop clip 1100 according to an alternative disclosed arrangement. Footman loop clip 1100 includes two J-shaped body arrangements 1102, 1104, each having a corresponding pin 1106, 1108. Each pin 1106, 1108 includes a pin head, compressed spring, and pull feature as describe above with respect to footman loop clip 500. In this disclosed arrangement, however, either or both pins 1106, 1108 may be depressed from a respective pin head 1110, 1112, or may be pulled using respective pull features 1114, 1116 in an arrangement, similar to that of FIG. 8, in which pull features 1114, 1116 are oriented in a direction facing away from a vehicle. It is also contemplated that, although a gap is illustrated between pin heads 1110, 1112 and the respective depression into which pin heads 1110, 1112 fit, the ends may likewise be designed having no gap therebetween, as also illustrated in FIGS. 5A and 5B, as examples.

According to the disclosure, a method of fabricating a footman loop clip includes providing a body having a J-shaped profile and having a hole passing through the body, the body having an upper end and a lower loop that form the J-shaped profile, the body having a lip formed at the upper end of the body and an attachment feature for attaching a strap thereto. The method includes passing a pin through the hole, the pin having a pin head at a first end, positioning a compressed spring between the pin head and the body such that the pin head is pressed away from the body and the compressed spring surrounds the pin, and attaching a pull feature to a second end of the pin to enable the pin to be pulled against the compressed spring. When the pull feature is pulled, the pin head is pulled toward the body causing a clearance to be formed in the lower loop between the pin head and the lower loop.

Also according to the disclosure, a system for attaching equipment to a vehicle, the system includes a vehicle having a footman loop, and a footman loop clip that includes a body having a J-shaped profile and having a hole passing through the body, the body having an upper end and a lower loop that form the J-shaped profile, a lip formed at the upper end of the body having an attachment feature for attaching a strap thereto, a pin passing through the hole and having a pin head at a first end of the pin, a compressed spring surrounding the pin and positioned between the pin head and the body such that the pin head is pressed away from the body, and a pull feature attached to a second end of the pin to enable the pin to be pulled against the compressed spring. When the pull feature is pulled, the pin head is pulled toward the body causing a clearance to be formed in the lower loop between the pin head and the lower loop such that the clearance can pass over the footman loop.

The disclosed footman loop clip includes the following features:

Overall body of the clip is 2¾" in one example. Ribs may be added to the curvature for added strength and rigidity (not shown). The lip of the J-shape is extended down further towards the middle of the body. The curve of rollover radiused—wider at curve to accommodate footman loops of all thicknesses and heights off of vehicles. This allows for more space for bouncing and is easier to put on vehicles with obstructions and variations in body sides. The J-shape to body is has, in one example, a throat spacing of 1". Rectangular slot (element 532) is 9/16" top to bottom to accommodate carabiners and straps. The pin with spring is set close to the thumb cutout on the lip of the J-shape. This is to help stop accidental release from the footman loop on the vehicle. The pin is extended due to curvature of the lip. In one example, the top of the pin is level with the lip. According to the disclosure the pin is a solid machined pin which is more rigid, strong, and reliable than a hollow pin. In one example, the spring in the disclosed device is stainless steel.

According to one example, the disclosed footman loop clip includes a thumb cutout, another version may instead have a straight lip for the end of the pull pin to press against. In this example, the lip covers a portion, more than half of the head of the pin, which reduces the propensity for the pin head to be depressed inadvertently and during use.

In one example, the Footman loop clip will be stamped out of #4130 chrome moly tool steel and will be heat treated for strength.

According to the disclosure and generally referring to the figures, the disclosed footman loop clip includes a J-shaped profile that forms a body of the footman loop clip. The J-shaped profile includes a slotted opening that accommodates the use of straps, so that straps may be joined end-to-end and tensioned together to form an improved strapping system. The J-shaped profile could include a lip that is flat (i.e., no cutout for a thumb clearance), to prevent inadvertent pressing of the pin, which could release the J-shaped hook from its footman loop.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain arrangements, and should in no way be construed so as to limit the claimed invention.

Accordingly, it is to be understood that the above description is intended to be illustrative and not restrictive. Many applications other than the examples provided would be upon reading the above description. It is anticipated and intended that future developments will occur in the arts discussed herein, and that the disclosed systems and methods will be incorporated into such future arrangements. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A clip for a footman loop, comprising:
    a body having a first portion and a second portion, and a bend formed between the first portion and the second portion such that an end of the second portion is inboard of the bend, the end of the second portion having a cutaway that includes a curved unenclosed surface, the first portion having an aperture passing therethrough;
    a pin passing through the aperture and having a pin head on one end and on one side of the first portion, and having a pull feature on an other end and on the other side of the first portion, the pin head positioned to contact the curved unenclosed surface of the cutaway about only a portion of an outer circumference of the pin head, the pin head having an outer diameter that is larger than a diameter of the aperture; and
    a spring in contact with the pin head, wherein the spring biases the pull feature toward the second portion, the spring positioned such that when the pin is at a first position, the pull feature is biased at a first bias force toward the first portion;
    wherein when the pull feature is pulled away from the first portion such that the pin is at a second position, the pull feature is biased at a second bias force that is greater than the first bias force and a gap formed between the pin head and the end of the second portion is increased.

2. The clip of claim 1, further comprising a lip formed in the first portion, the lip extending orthogonal to an axis of the pin, the axis extending along a length of the pin, the lip having an opening through which one of a strap and a carabiner may pass.

3. The clip of claim 2, wherein the bend is positioned to one side of the axis of the pin, and the lip having the opening extends to another side of the axis and opposite the one side.

4. The clip of claim 1, further comprising the pin having a pin aperture that passes through the other end of the pin, and the pull feature passes through the pin aperture.

5. The clip of claim 4, wherein the pull feature includes one of a pull ring, a pull strap, and a T-shaped handle.

6. The clip of claim 1, wherein the curved unenclosed surface of the cutaway includes a diameter that is approximately the same as the outer diameter as the pin head.

7. The clip of claim 6, wherein when the pin is at the first position the curved unenclosed surface cutaway is in contact with the outer diameter of the pin head over at least 60 degrees about the outer circumference of the pin head.

8. The clip of claim 1, wherein the spring surrounds the pin and the spring is positioned between the pin head and the first portion.

9. A method of fabricating a clip, comprising:
    providing a body having a first portion and a second portion, the body having a bend formed between the first portion and the second portion such that an end of the second portion is inboard of the bend, the end having a cutaway that includes a curved unenclosed surface, the first portion having an aperture passing therethrough;
    passing a pin through the aperture, the pin having a pin head on one end and on one side of the first portion, the pin head positioned to contact the curved unenclosed surface of the cutaway about only a portion of an outer circumference of the pin head, the pin head having an outer diameter that is larger than a diameter of the aperture;
    positioning a spring that against the first portion and in contact with the pin head, wherein the spring biases the pull feature toward the second portion such that when the pin is at a first position, the pull feature is biased at a first bias force toward the first portion; and
    attaching a pull feature on an other end and on the other side of the first portion;
    wherein when the pull feature is pulled away from the first portion such that the pin is at a second position, the pull feature is biased at a second bias force that is greater than the first bias force and a gap formed between the pin head and the end of the end of the second portion is increased.

10. The method of claim 9, wherein providing the body further comprises providing the body having a lip formed in the first portion, the lip extending orthogonal to an axis of the pin, the axis extending along a length of the pin, the lip having an opening through which one of a strap and a carabiner may pass.

11. The method of claim 9, wherein providing the body further comprises providing a pin aperture that passes through the other end of the pin, further comprising passing the pull feature through the pin aperture.

12. The method of claim 11, wherein passing the pull feature includes passing one of a pull ring, a pull strap, and a T-shaped handle through the aperture.

13. The method of claim 9, wherein a diameter of the pin at the second end of the pin is smaller than a diameter of the hole.

14. The method of claim 9, wherein the end of the second portion includes a cutaway having a diameter that is approximately the same as the outer diameter as the pin head.

15. The method of claim 14, wherein when the pin is at the first position the cutaway of the second portion is in contact with the outer diameter of the pin head over at least 60 degrees about the outer circumference of the pin head.

16. A system for attaching equipment to a vehicle, the system comprising:
    a vehicle having a footman loop; and
    a clip that includes:
        a body having a first portion and a second portion, and a bend formed between the first portion and the second portion such that an end of the second portion is inboard of the bend, the end having a cutaway that includes a curved unenclosed surface, the first portion having an aperture passing therethrough;
        a pin passing through the aperture and having a pin head on one end and on one side of the first portion, and having a pull feature on an other end and on the other side of the first portion, the pin head positioned to contact the curved unenclosed surface of the cutaway about only a portion of an outer circumference of the pin head, the pin head having an outer diameter that is larger than a diameter of the aperture; and
        a spring in contact with the pin head, wherein the spring biases the pull feature toward the second portion, the spring positioned such that when the pin is at a first position, the pull feature is biased at a first bias toward the first portion;
        wherein when the pull feature is pulled away from the first portion such that the pin is at a second position, the pull feature is biased at a second bias force that is greater than the first bias force, and a gap formed between the pin head and the end of the second portion is increased.

17. The system of claim 16, further comprising a lip formed in the first portion, the lip extending orthogonal to an axis of the pin, the axis extending along a length of the pin, the lip having an opening through which one of a strap and a carabiner may pass.

18. The system of claim 17, wherein the bend is positioned to one side of the axis of the pin, and the lip having the opening extends to another side of the axis and opposite the one side.

19. The system of claim 18, wherein the pull feature includes one of a pull ring, a pull strap, and a T-shaped handle.

20. The system of claim 16, wherein the curved unenclosed surface of the cutaway includes a diameter that is approximately the same as the outer diameter as the pin head.

21. The system of claim 20, wherein when the pin is at the first position the curved unenclosed surface of the cutaway is in contact with the outer diameter of the pin head over at least 60 degrees about the outer circumference of the pin head.

* * * * *